(12) United States Patent  
Stimely (10) Patent No.: US 7,581,740 B1
(45) Date of Patent: Sep. 1, 2009

(54) GOLF CART FRONT SUSPENSION LIFT SYSTEM

(76) Inventor: Steven J. Stimely, 76 Judge Rd., Stimely, PA (US) 17051

( * ) Notice: Subject to any disclaimer, the term of this patent is extended or adjusted under 35 U.S.C. 154(b) by 202 days.

(21) Appl. No.: 11/615,064

(22) Filed: Dec. 22, 2006

Related U.S. Application Data (60) Provisional application No. 60/597,893, filed on Dec. 22, 2005.

(51) Int. Cl.
*B60G 7/00* (2006.01)
(52) U.S. Cl. ............................................. 280/124.136
(58) Field of Classification Search ............ 280/124.15, 280/124.134, 124.135, 124.136, 124.147
See application file for complete search history.

(56) References Cited

U.S. PATENT DOCUMENTS

| | | | |
|---|---|---|---|
| 4,657,271 A * | 4/1987 | Salmon | 280/124.139 |
| 6,695,329 B2 * | 2/2004 | Handa | 280/124.135 |
| 2003/0006573 A1 * | 1/2003 | Seki | 280/124.135 |
| 2006/0006623 A1 * | 1/2006 | Leclair | 280/93.512 |
| 2007/0114747 A1 * | 5/2007 | Morgan | 280/124.135 |

* cited by examiner

*Primary Examiner*—Paul N. Dickson
*Assistant Examiner*—Robert A. Coker
(74) *Attorney, Agent, or Firm*—John J. Elnitski, Jr.

(57) ABSTRACT

A front suspension lift system including a main frame having two sides, front and rear. The front suspension lift system including an upper arm and lower arm on each of the sides of the main frame, where the upper arm and lower arm pivotally connected to the main frame. An axle assembly adapted to receive a wheel on each of the sides of the main frame, the axle assembly rotatably connected between the upper arm and the lower arm. At least one support which is adapted to mount to the golf cart, the at least one support having a plurality of holes to allow mounting of shocks between the lower arm and the at least one support, the plurality of holes allowing for adjustment of suspension parameters of the front suspension lift system base on which of the plurality of holes is chosen to mount the shock.

14 Claims, 14 Drawing Sheets

GOLF CART FRONT SUSPENSION LIFT SYSTEM

BACKGROUND

The present invention generally relates to golf carts. More specifically, the present invention relates to front suspensions and lift kits used with golf carts.

It has become very popular to install larger wheels and tires on golf carts. The larger wheels and tires provide greater ground clearance and enhance the appearance of the golf cart. The installation of larger wheels and tires on a golf cart is a challenge. Just adding the larger wheels and tires creates a problem of the tire not fitting under the body of the golf cart. There have been different approaches to solve this problem. Most of them involve modifying the frame or the body of the golf cart. The problem with modifying the frame is that the frame must be cut and welded, which makes it difficult for the do-it-yourselfer to just add the larger wheels and tires to a golf cart. The problem with modifying the body is that the body must be cut, which makes it difficult for the do-it-yourselfer to just add the larger wheels and tires to a golf cart. Another problem is that the lift kits are not flexible as far as changing heights of the axle from the ground and adjusting stiffness of the shocks.

It is an object of the present invention to provide a front suspension lift system for golf carts that is easier to install and provides the flexibility of being able to change suspension parameters.

SUMMARY OF THE INVENTION

A front suspension lift system including a main frame having two sides, front and rear. The front suspension lift system including an upper arm and lower arm on each of the sides of the main frame, where the upper arm and lower arm pivotally connected to the main frame. An axle assembly adapted to receive a wheel on each of the sides of the main frame, the axle assembly rotatably connected between the upper arm and the lower arm. At least one support which is adapted to mount to the golf cart, the at least one support having a plurality of holes to allow mounting of shocks between the lower arm and the at least one support, the plurality of holes allowing for adjustment of suspension parameters of the front suspension lift system base on which of the plurality of holes is chosen to mount the shock.

BRIEF DESCRIPTION OF DRAWINGS

FIG. 6 is a perspective view of A-arms of a front suspension lift system according to the present invention.

DETAILED DESCRIPTION

The present invention is a front suspension lift system for golf carts, as shown in FIGS. 1-14. The front suspension lift system allows the installation of a larger wheel and tire combination on the front of a golf cart. The front suspension lift system lifts the body of the golf cart and increases the distance between the body and the axle as compared to the distance between the body and the axle on a stock golf cart. The front suspension lift system adjusts the axle position down and forward from the original axle position. After installation, the front suspension lift system allows adjustment of the axle up and down and adjustment of the stiffness of the shocks.

The front suspension lift system is based on a foundation of a multi-plate configuration of a front plate, bottom rear plate and one or more rear top plates. The rear top plate or plates act as shock supports for shocks 86. FIGS. 1-5 show a version with one rear top plate and FIGS. 8-13 show a version which employs two rear top plates. The multi-plate configuration provides connection points for the other components of the front suspension lift system. Each of the plates includes connection holes for the other components. The front plate and bottom rear plate form a main frame of the front suspension lift system for all versions of the present invention. FIGS. 1-7 show a first configuration mountable on most golf carts where most of the stock framework of the front of a golf cart 20 can be removed by the user. FIGS. 8-14 show a second configuration mountable on golf carts where most of the stock framework is not easily remove and must remain on the golf cart 20.

The first configuration shows the main frame 18 including two top support members 22 and one bottom support member 24. The top support members 22 and the bottom support member 24 are shown as tubular in shape. The top support members 22 are welded to the top corners of the front plate 10 and bottom rear plate 12. The bottom support member 24 is welded to the bottom center of the front plate 10 and bottom rear plate 12. The front plate 10 and bottom rear plate 12 each have round cutouts 26 where the top support members 22 and the bottom support member 24 are welded to the front plate 10 and bottom rear plate 12. The top support members 22 and the bottom support member 24 continue beyond the bottom rear plate 12 and onto a rear cross-member 28. The top support members 22 and the bottom support member 24 end at and are welded at the rear cross-member 28. The angle of approach of the top support members 22 and the bottom support member 24 from the bottom rear plate 12 to the rear cross-member 28 may change based on the make and model of the golf cart 20 that the front suspension lift system will be attached. The rear cross-member 28 includes two rear body mounting flanges 30. The two rear body mounting flanges 30 bolt to the bottom of the body of the golf cart 20, as two of the connection points of the front suspension lift system to the golf cart 20.

Figure 1:
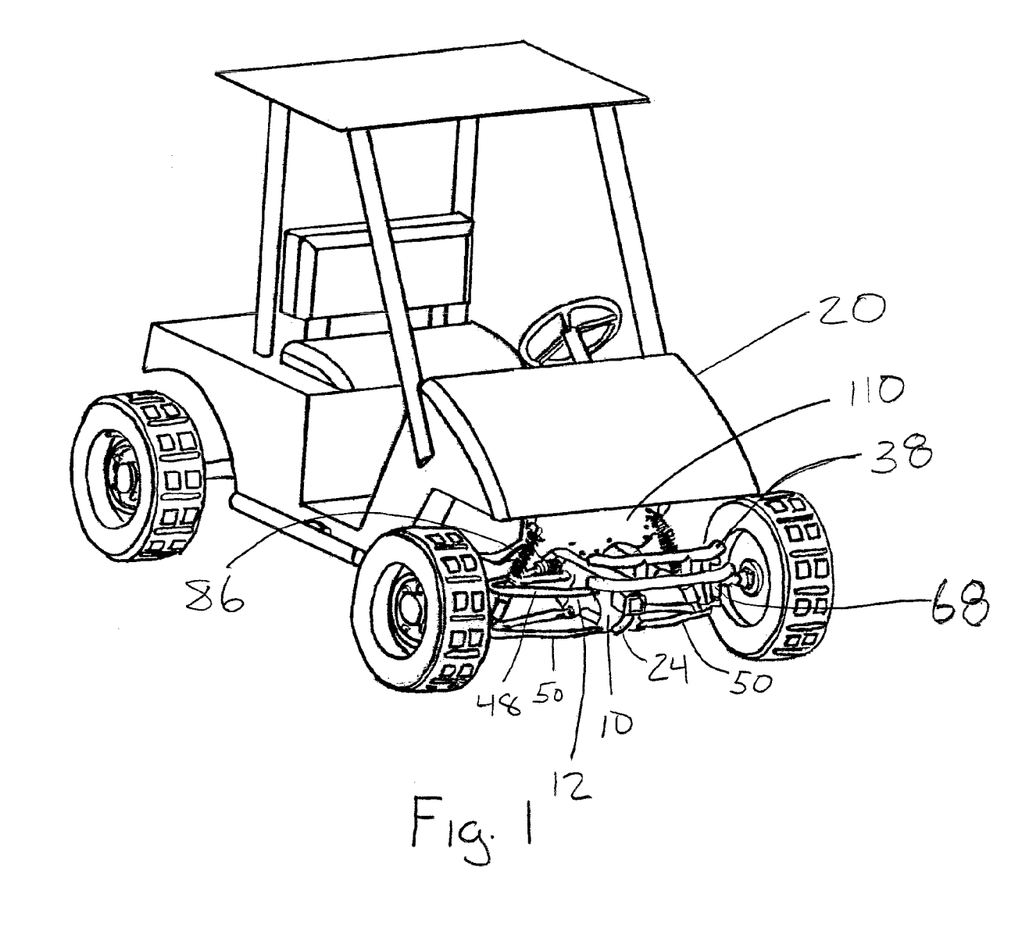
FIG. 1 is a perspective view of components of a front suspension lift system according to the present invention.
Figure 2:
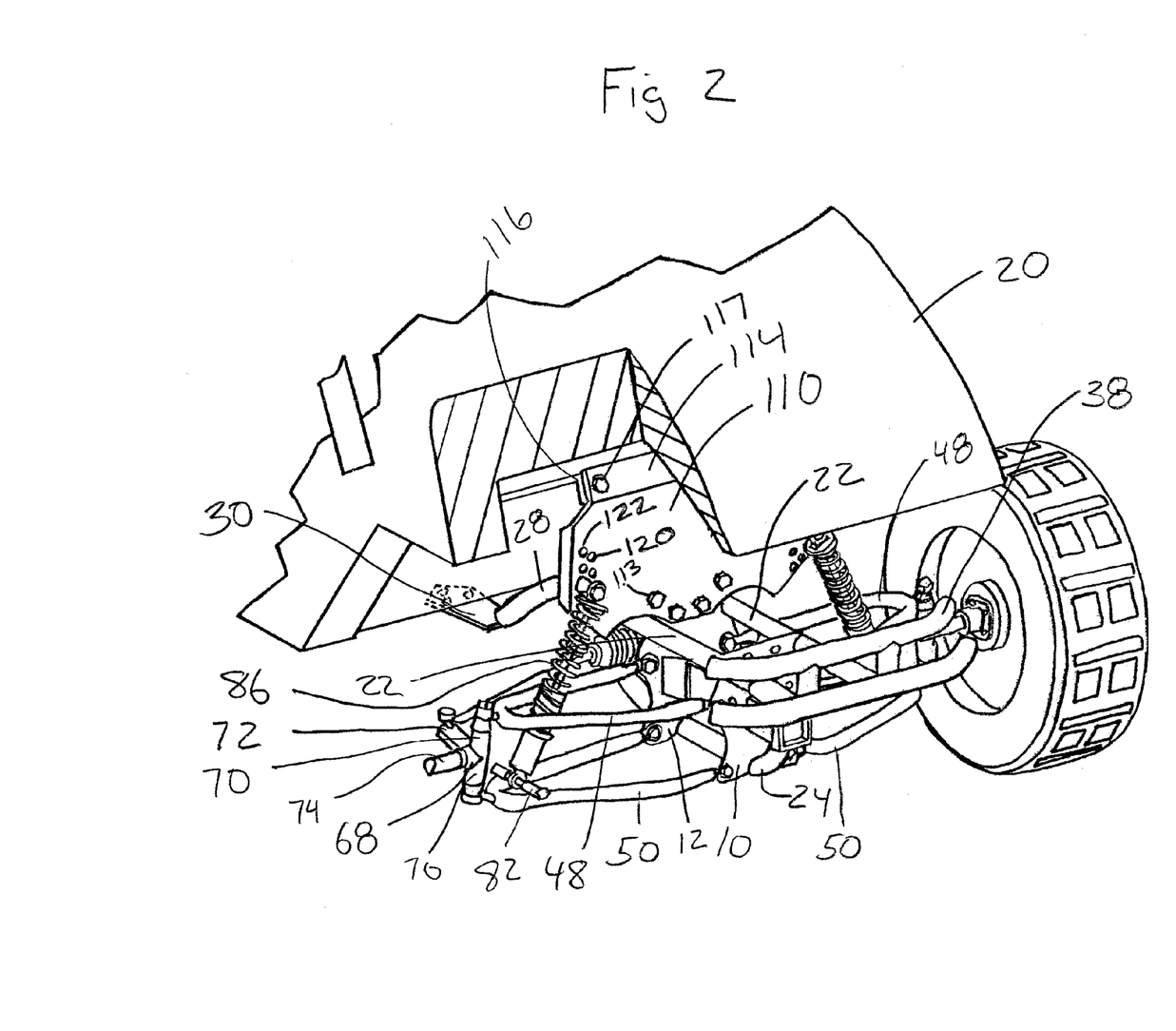
FIG. 2 is a perspective view of components of a front suspension lift system according to the present invention.
Figure 3:
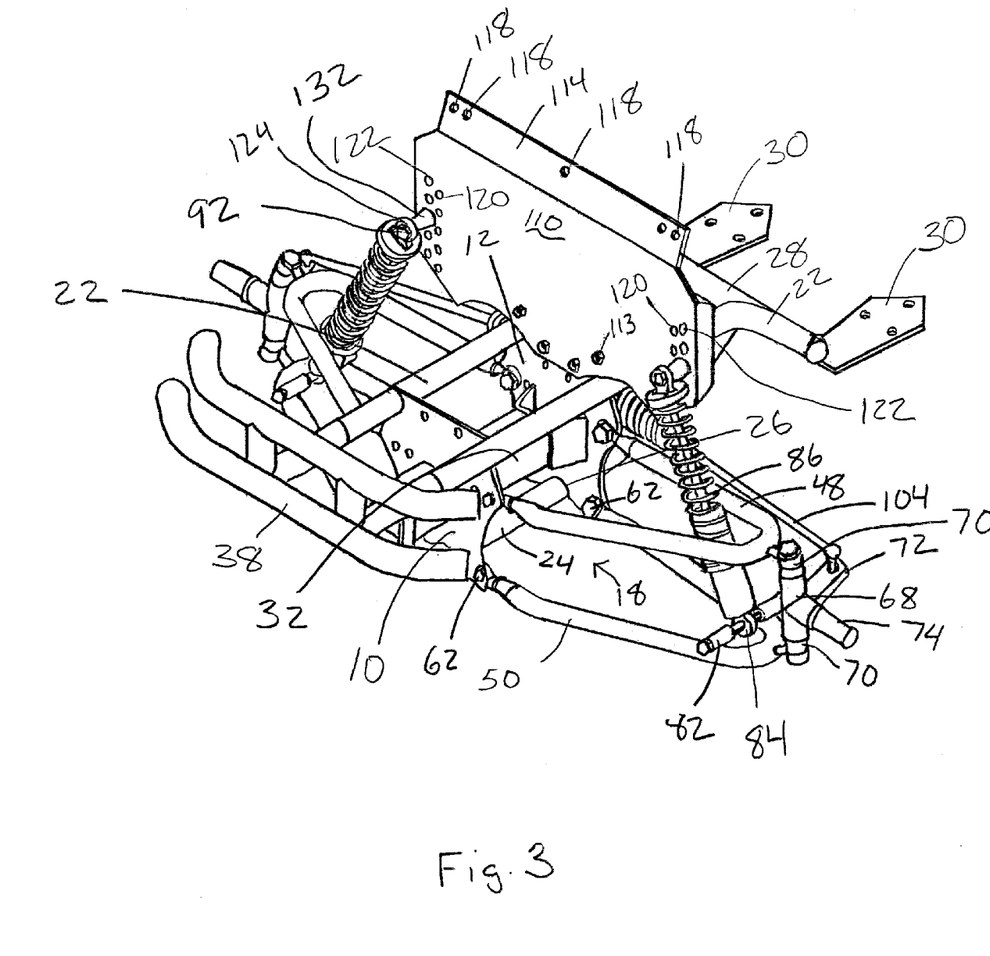
FIG. 3 is a perspective view of components of a front suspension lift system according to the present invention.
Figure 4:
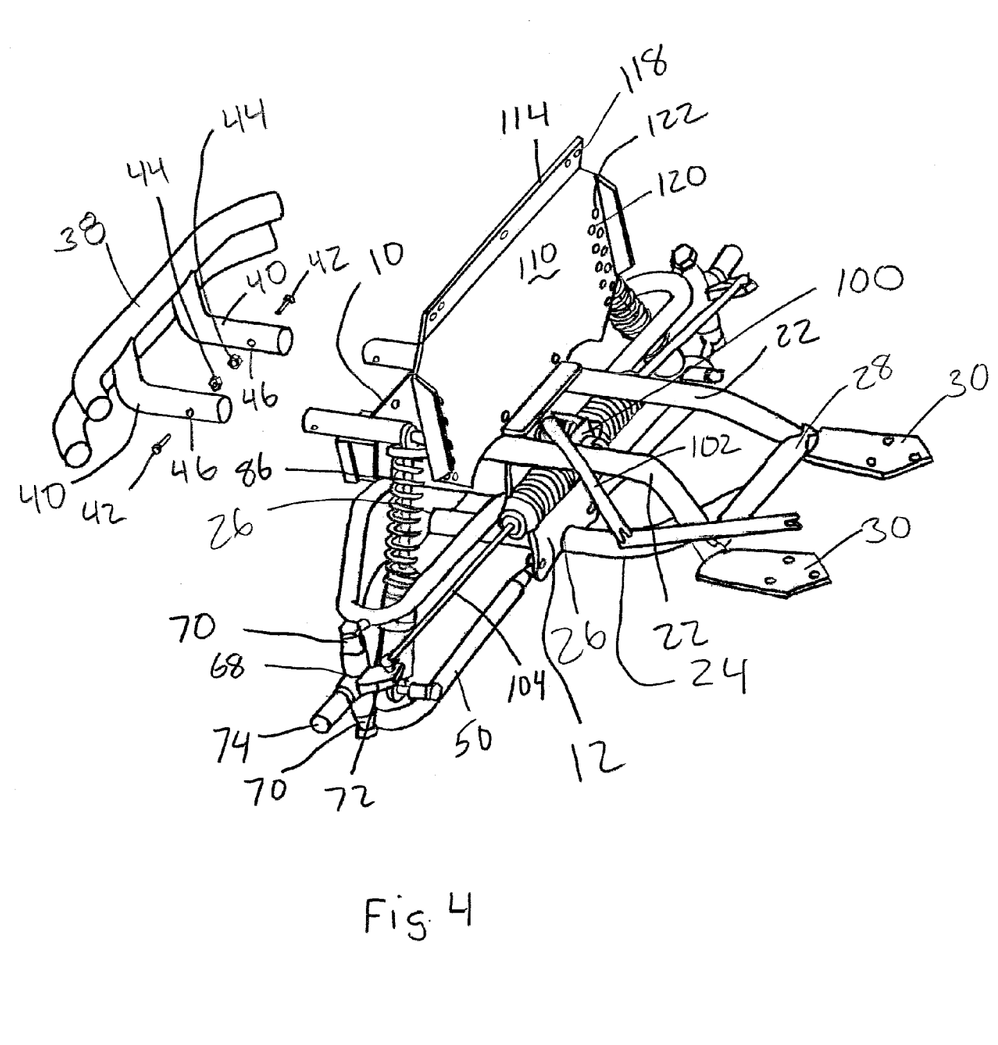
FIG. 4 is a perspective view of components of a front suspension lift system according to the present invention.
Figure 5:
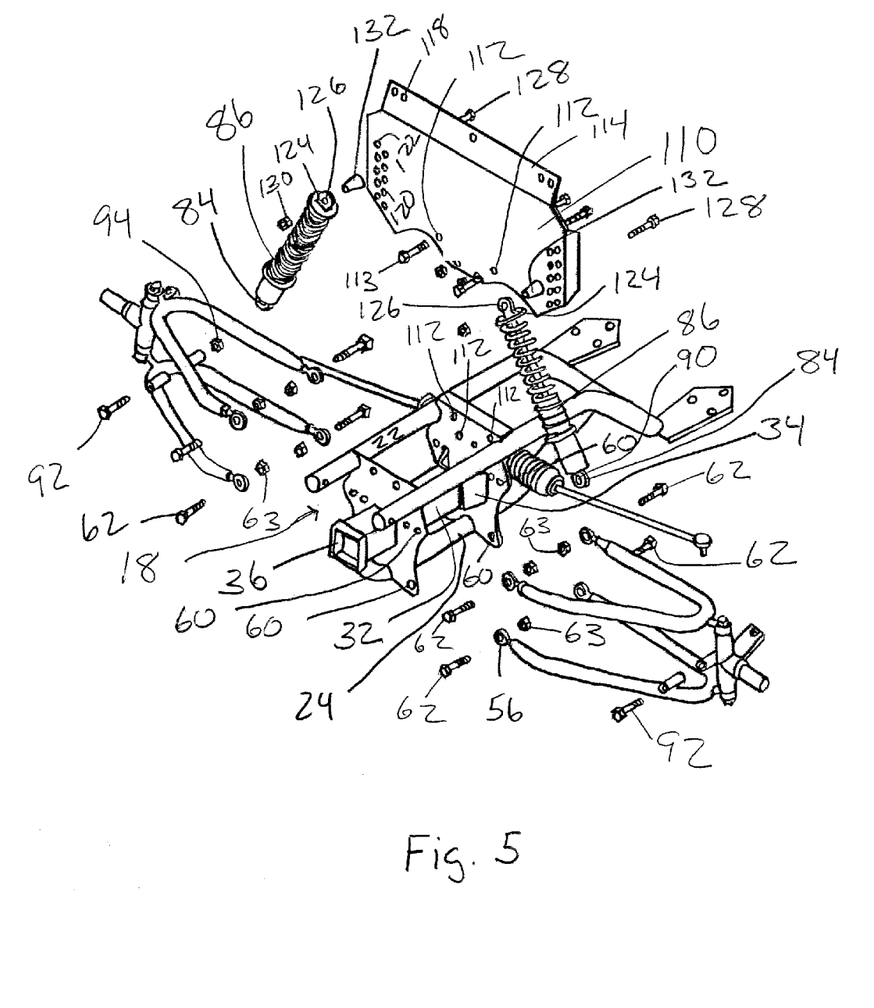
FIG. 5 is a perspective exploded view of components of a front suspension lift system according to the present invention.
Figure 7:
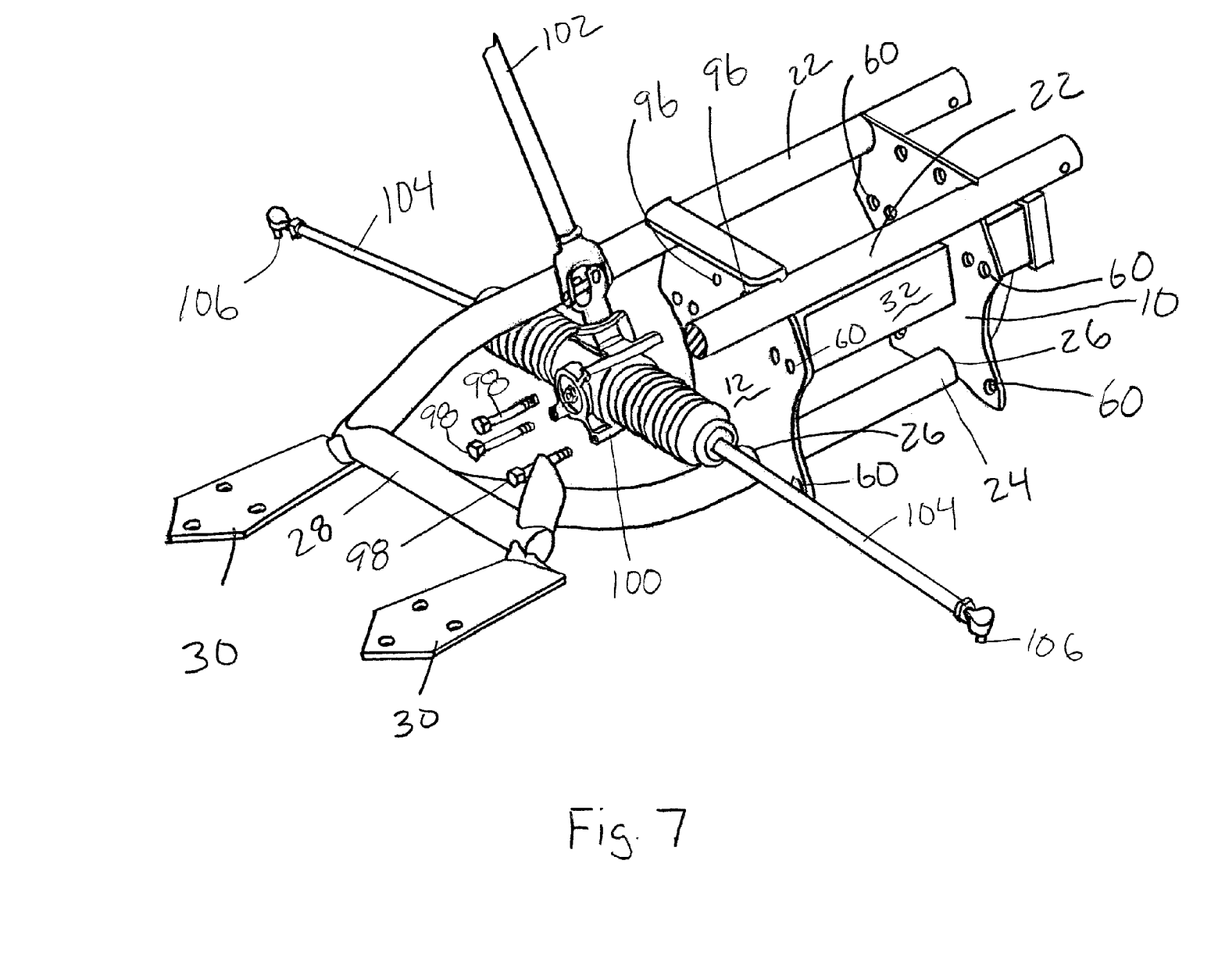
FIG. 7 is a perspective view of a steering components and main frame of a front suspension lift system according to the present invention.

The main frame 18 includes a center support 32 welded to the center front of the bottom rear plate 12. The center support 32 is shown as a square tubular member welded to two flanges 34 and the two flanges 34 are welded to the bottom rear plate 12. The center support 32 passes through a cutout (not shown) in the center of the front plate 10 and is welded about that cutout. The center support 32 includes a hitch section 36 which extends forward of the front plate 10. The hitch section 36 is fashion in the same way as a towing receiver on a vehicle to allow hookup of towing implements, as well as the use of other accessories that can be used with a towing receiver. FIGS. 2, 5 and 7 shows the bottom support member 24 curving upward to the hitch section 36. The bottom support 36 is welded to the hitch section 36 to add strength to the main frame 18. The two top support members 22 also extend forward of the front plate 10 to receive a bumper 38. The bumper 38 includes two attachment tubes 40 which slip over the two top support members 22 and are secured using bumper bolts 42, bumper nuts 44 and bumper holes 46, as shown in FIG. 4. The bumper holes 46 which are part of the top support members 22 and attachment tubes 40 align with each other.

There is an upper arm 48 and a lower arm 50 mounted to each side of the main frame 18. The upper arms 48 and lower arms 50 are A-shaped and typically referred to as an A-arm. Each of the upper arms 48 and lower arms 50 have main frame connection ends 52 and a spindle connection end 54. The main frame connection ends 52 each include a main frame Hiem joint 56 with a bearing having a bolt hole 58. The upper arms 48 and lower arms 50 are mounted to the main frame 18 by bolting the main frame Hiem joints 56 to arm holes 60 in the front plate 10 and bottom rear plate 12 with bolts 62 and nuts 63. The main frame Hiem joints 56 allow the upper arms 48 and lower arms 50 to pivot about the bolts 62 during movement of the golf cart 20. The spindle connection end 54 of the upper arms 48 and lower arms 50 each include a spindle Hiem joint 64 with a bearing having a bolt hole 66. FIG. 6 shows a spindle 68 having two arm ends 70, steering rod arm 72 and an axle 74, which together act as an axle assembly. The spindle 68 is fitted between each set of upper arms 48 and lower arms 50, whereby a bolt 76 fits into the bolt hole 66 of the spindle Hiem joint 64 and an opening 78 between the arm ends 70 of the spindle 68. An nut 80 secures the bolt 76 in place. The bearings in the spindle Hiem joint 64 allows the spindle 68 to rotate about the spindle Hiem joint 64 during steering. The lower arms 50 each include two shock sleeves 82 welded near the spindle connection end 54. The shock sleeves 82 receive a bottom shock joint 84 of the shock 86 between the shock sleeves 82. The shock sleeves 82 each include a bolt opening 88 and the bottom shock joint 84 includes a bolt hole 90. A bolt 92 and nut 94 are used with the bolt opening 88 and bolt hole 90 to secure the bottom shock joint 84 between the shock sleeves 82. The combination of the positioning of the upper arms 48, lower arms 50 and main frame 18 together lift the body of the golf cart 20 away from the axles 74 and extend the axles 74 forward from the body of the golf cart 20. By lifting the body of the golf cart 20 away from the axles 74 and extending the axles 74 forward from the body of the golf cart 20, a larger wheel and tire combination can be used with the golf cart 20.

The bottom rear plate 12 includes steering box holes 96 to receive bolts 98 to bolt a steering box 100 to the back of the bottom rear plate 12. The steering box 100 is know in the art and includes a steering rod 102 which connects to the existing steering wheel linkage (not shown) of the golf cart 20. The steering box 100 also includes tie rods 104 which bolt to the steering arms 72 of the spindles 74. The tie rods 104 include studs 106 which fit into stud holes 108 of the spindle arms 72 and are secure by methods known in the art. Rotational movement of the steering arm 102 turns the known internal parts of the steering box 100, which in turn moves the tie rods 104.

The first configuration includes one top rear plate 110 to support the top of the shocks 86, as shown in FIGS. 2-5. The bottom rear plate 12 includes bolt holes 112 near the top of the bottom rear plate 12 and top rear plate 110 includes bolt holes 112 near the bottom of the top rear plate 110. The bolt holes 112 align to allow the connection of the top rear plate 110 to the bottom rear plate 12 with bolts 113. The top rear plate 110 includes a body frame flange 114 at the top of the top rear plate 110 that angles to match an existing structural support 116 of the golf cart 20. The body frame flange 114 includes bolt holes 118 to bolt the top rear plate 110 to the existing structural support 116 of the golf cart 20 using bolts 117. The top rear plate 110 also serves as a third connection point between the front suspension lift system and the golf cart 20. The top rear plate 110 includes a series of inner shock holes 120 and outer shock holes 122 on each side of the top rear plate 110. The shocks 86 include a top shock joint 124 with a bolt hole 126. The top shock joint 124 of each shock 86 on each side is connected to one of either the inner shock holes 120 or the outer shock holes 124 using a bolt 128, nut 130 and shock spacer 132. The shock spacer 132 includes a bolt opening (not shown). The distance of the axle 74 from the body and the stiffness of the shock 86 can be adjusted based on which shock hole is used. By choosing a higher hole verses a lower hole of the inner shock holes 120 or outer shock holes 124, the distance of the axle 74 from the body can be changed. By choosing an inner shock hole 122 verses an outer shock hole 124, the stiffness of the shocks can be changed.

Figure 8:
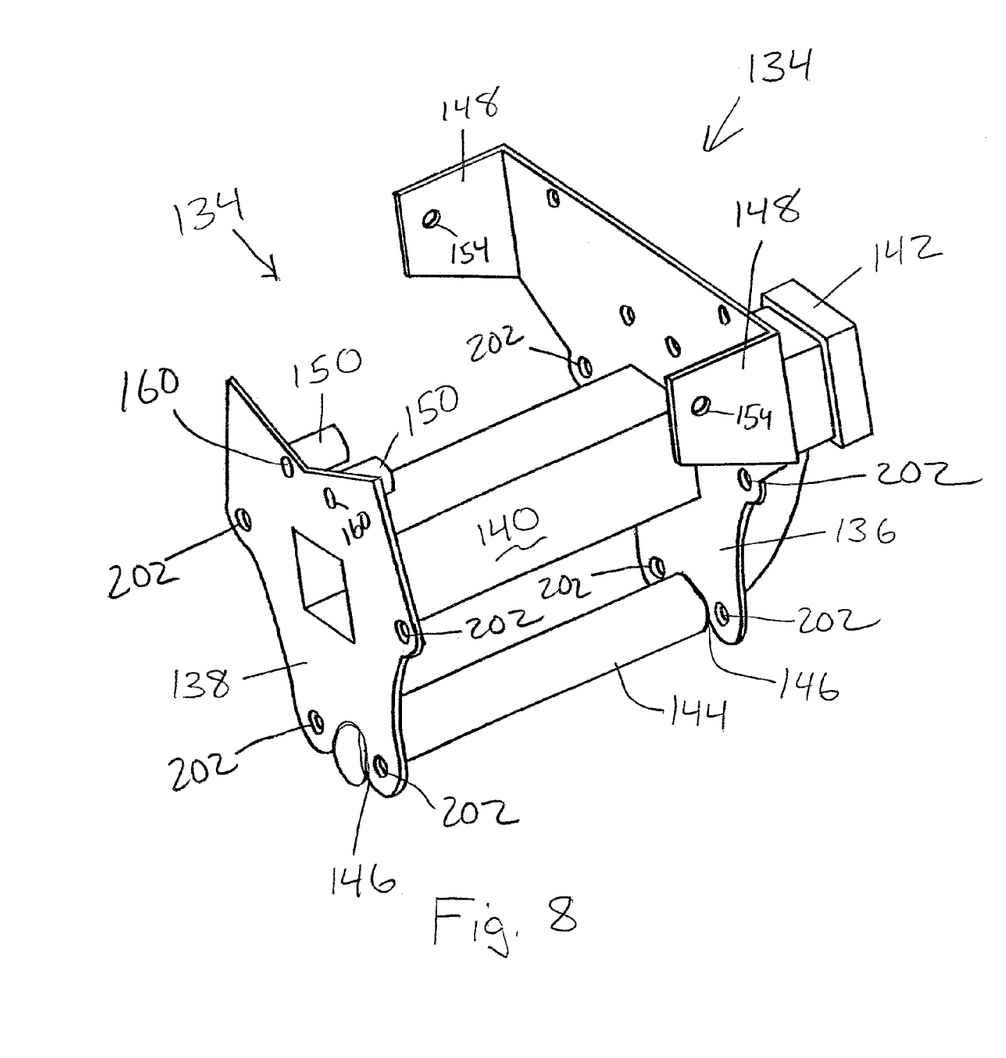
FIG. 8 is a perspective view of a main frame of a front suspension lift system according to the present invention.
Figure 9:
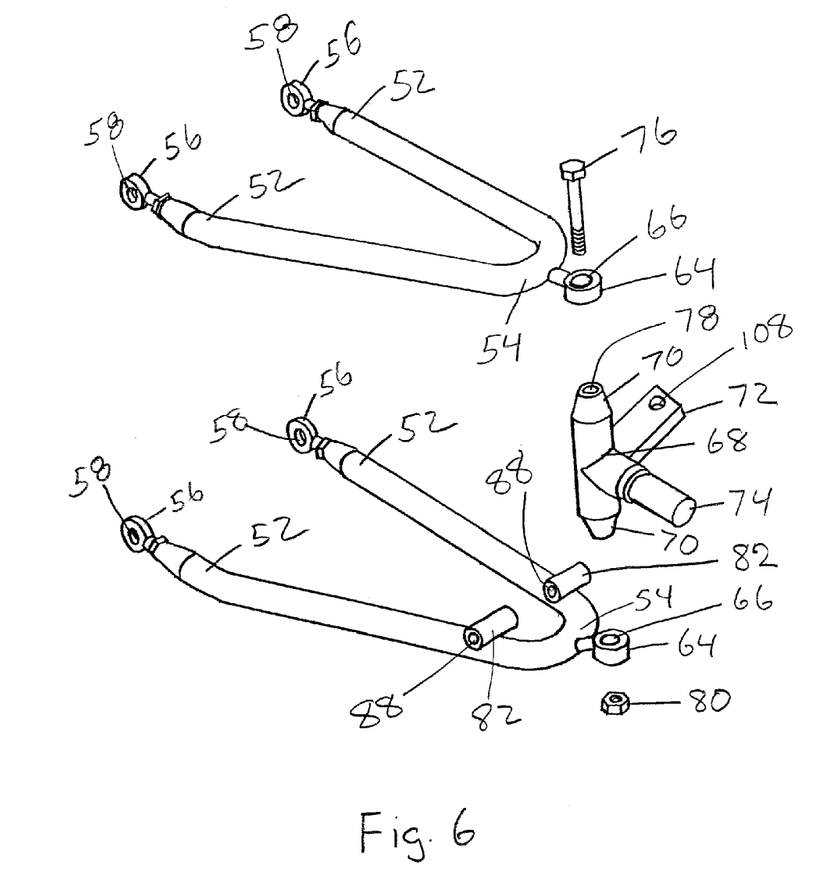
FIG. 9 is a perspective view of a main frame of a front suspension lift system according to the present invention.
Figure 10:
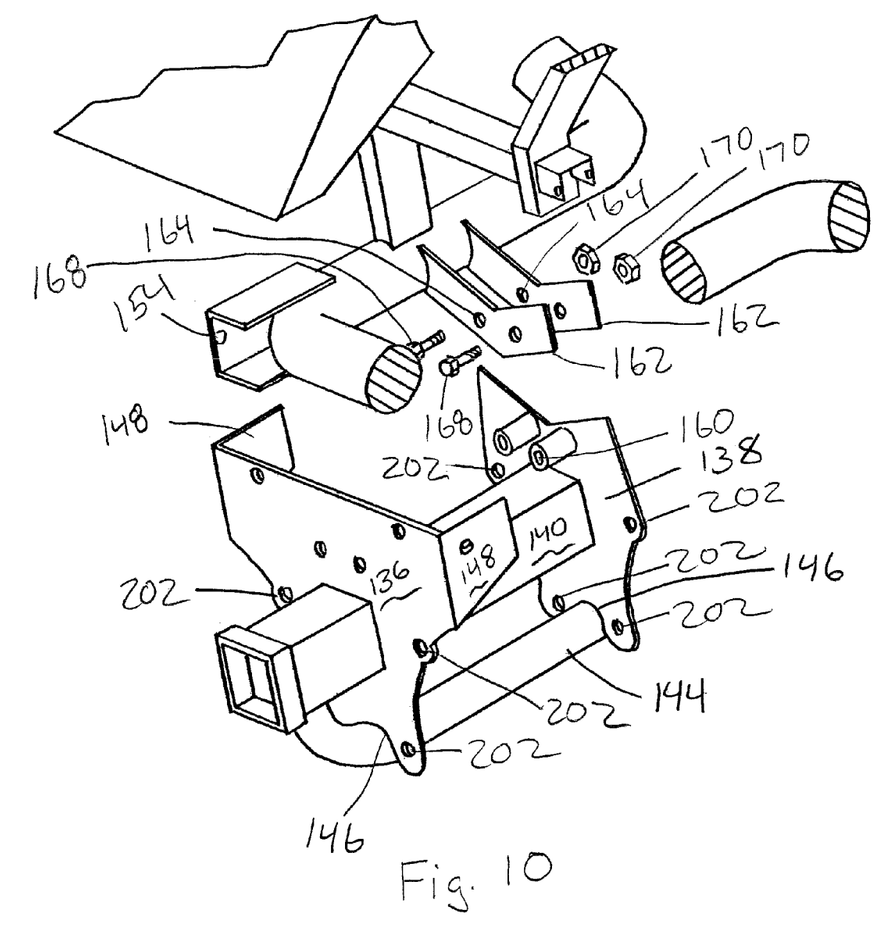
FIG. 10 is a perspective view of a main frame of a front suspension lift system according to the present invention.

The second configuration is shown in FIGS. 8-14. The main frame 134 shown in FIGS. 8-11 is different from the first configuration due to the need to mount the front suspension lift system to existing framework of the golf cart 20. The front plate 136 and bottom rear plate 138 are still connected together in the center by a center support 140 welded to the center front of the bottom rear plate 138. The center support 140 is shown as a square tubular member. The center support 140 passes through a cutout (not shown) in the center of the front plate 136 and is welded about that cutout. The center support 140 includes a hitch section 142 which extends forward of the front plate 136. The main frame 134 includes a bottom support member 144. The bottom support member 144 is shown as tubular in shape. The bottom support member 144 is welded to the bottom center of the front plate 136 and bottom rear plate 138. The front plate 136 and bottom rear plate 138 each have round cutouts 146 where the bottom support member 144 is welded to the front plate 136 and bottom rear plate 138. FIGS. 8-10 shows the bottom support member 144 curving upward to the hitch section 142. The bottom support member 144 is welded to the hitch section 142 to add strength to the main frame 134. Instead of top support members 22 used in the first configuration, the main frame 134 uses top support flanges 148 and top support spacers 150 to bolt to existing front supports 152 and existing rear supports 162 of the golf cart 20. The top support flanges 148 extend backward from the front plate 136. The top support flanges 148 bolt to the existing front supports 152 of the golf cart 20 using bolt holes 154, bolt 156 and nuts 158. The top support spacers 150 extend forward from the front of the bottom rear plate 138 and include bolt openings 160 from the front of the top support spacers 150 thru the rear of the bottom rear plate 138. The top support spacers 150 and the bottom rear plate 138 bolt between the existing rear supports 162 using bolt holes 164, bolt openings 160, bolts 168 and nuts 170, as shown in FIG. 10. The top support flanges 148 and top support spacers 150 can be in different positions, shapes and sizes, depending on the existing front supports and rear supports of the golf cart 20.

Figure 11:
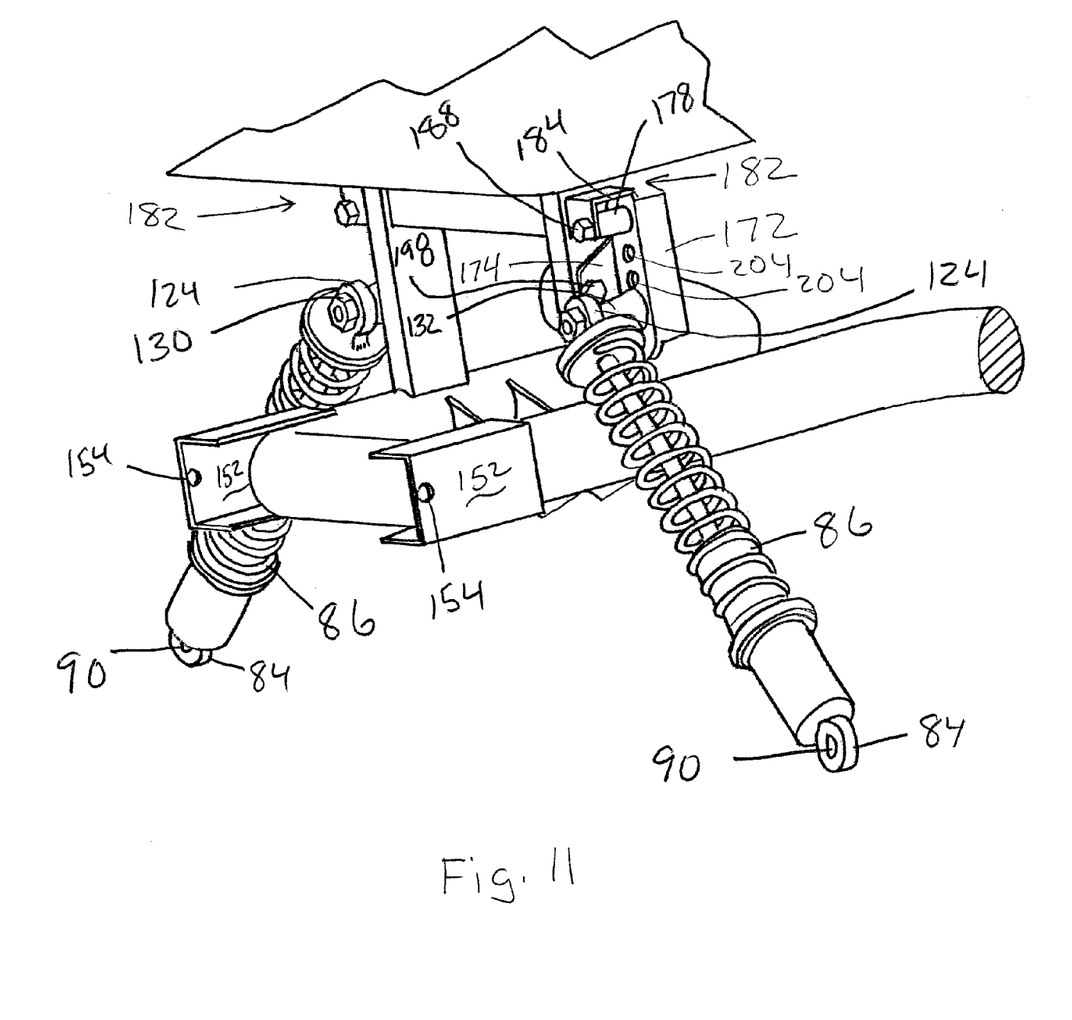
FIG. 11 is a perspective view of a top rear plates of a front suspension lift system according to the present invention.
Figure 12:
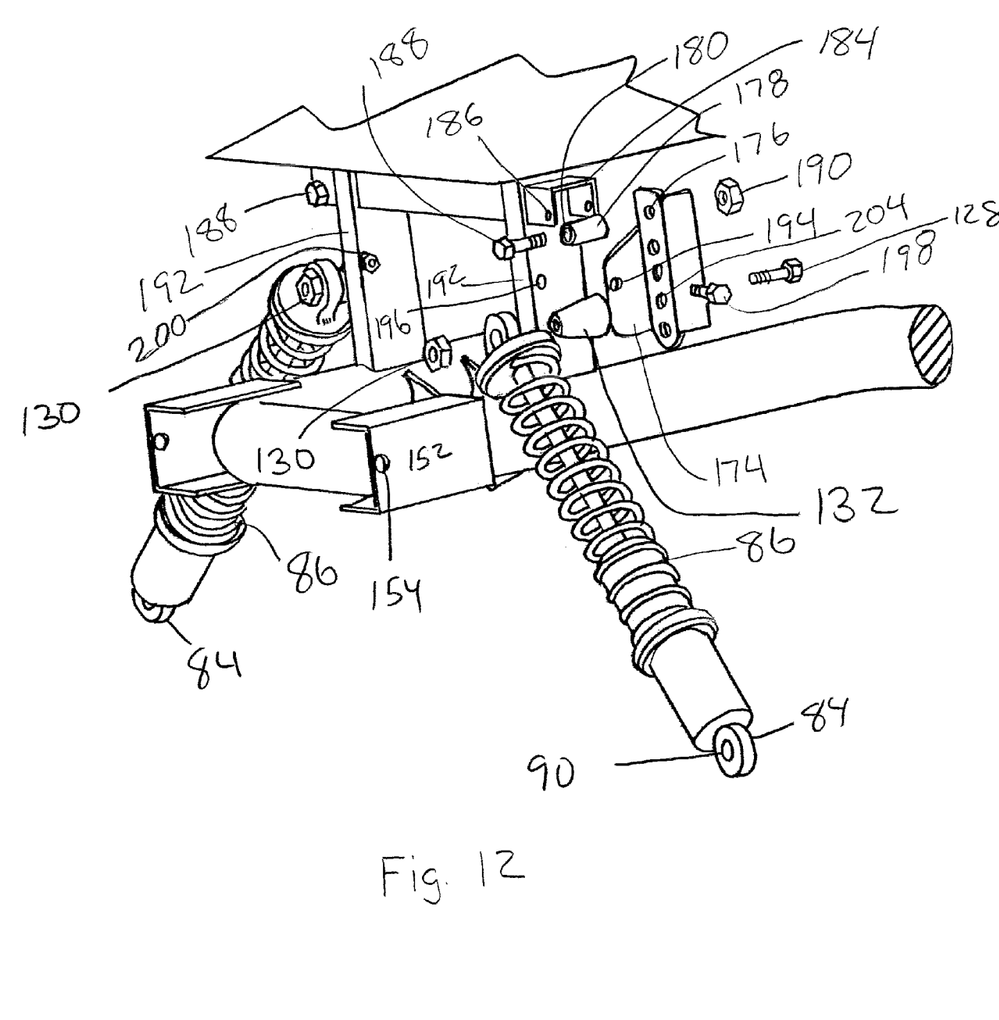
FIG. 12 is a perspective view of a top rear plates of a front suspension lift system according to the present invention.

The second configuration is shown with two top rear plates 172, whereby there is one on each side of the existing frame work of the golf cart 20 for attachment of the shocks 86. The top rear plates 172 include an attachment flange 174, bolt hole 176 and a spacer 178. The spacer 178 includes a bolt opening 180. The two top rear plates 172 each bolt to existing top supports 182 of the golf cart 20. One of the existing top supports 182 is a U-shaped channel section 184 with two bolt holes 186, as shown in FIGS. 11-12. Each top rear plate 172 is attached to the U-shaped channel section 184 by placing the top rear plate 172 within the U-shaped channel section 184 and aligning the top bolt hole 176 of the top rear plate 172 and the bolt holes 186 of the U-shaped channel section 184. The spacer 178 is also placed within the U-shaped channel section 184 and a bolt 188 is inserted into the bolt holes 186 of the U-shaped channel section 184, bolt hole 176 of the top rear plate 172 and bolt opening 180 of the spacer 178. A nut 190 secures the bolt 188 and top rear plate 172 in place. The top rear plate 172 is also secured to an existing rectangular down tube support 192. The top rear plate 172 is secured to an existing rectangular down tube support 192 using a bolt hole 194 in the attachment flange 174, bolt hole 196 in the existing rectangular down tube support 192, a bolt 198 and nut 200.

Figure 13:
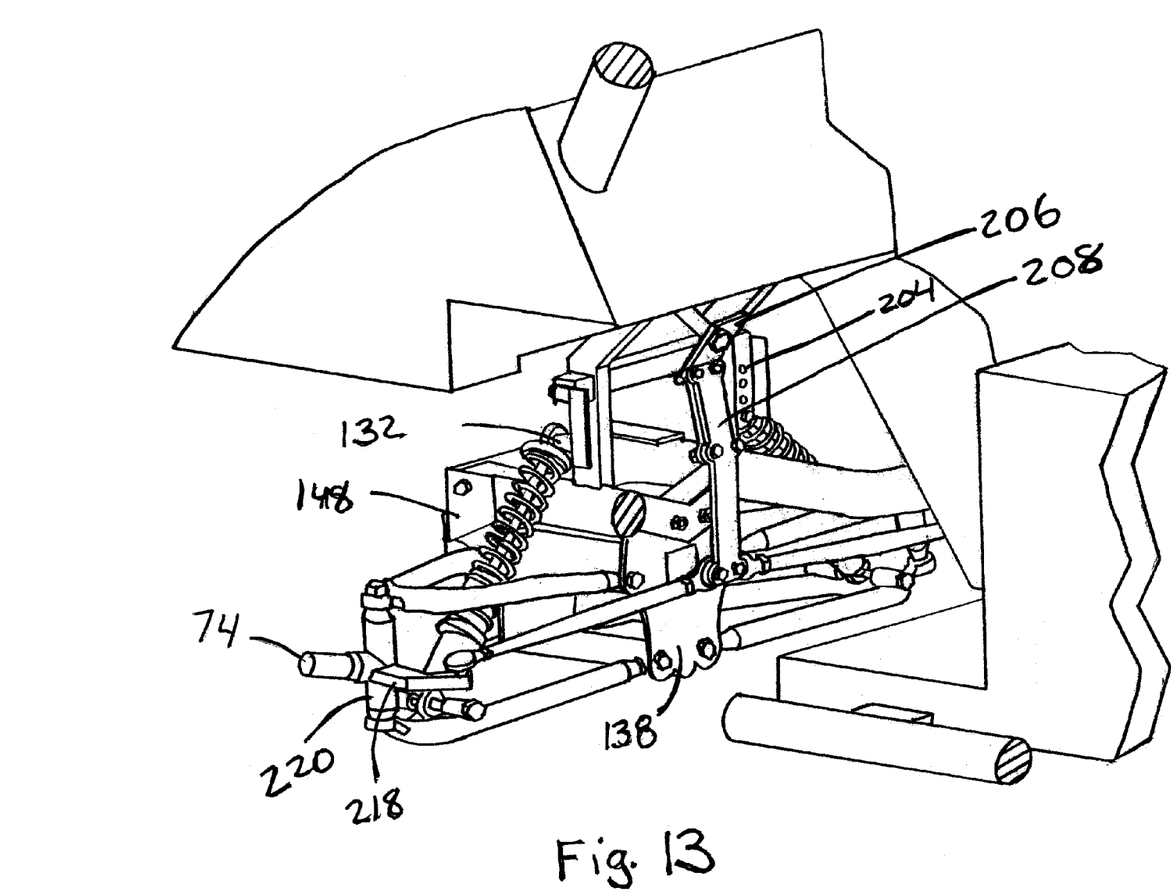
FIG. 13 is a perspective view of a front suspension lift system according to the present invention.

The main frame 134 includes bolt holes 202 to attached the upper arms 48 and lower arms 50 in the same manner as the first configuration, as shown in FIG. 13. The top rear plates 172 include a plurality of holes 204 to bolt the top shock joint 124 of the shock 86 along with the shock spacer 132 in a similar manner as the first configuration, as shown in FIGS. 11-13. The distance of the axle 74 from the body can be adjusted by choosing a higher hole verses a lower hole of the plurality of holes 204 on the top rear plates 172.

Figure 14:
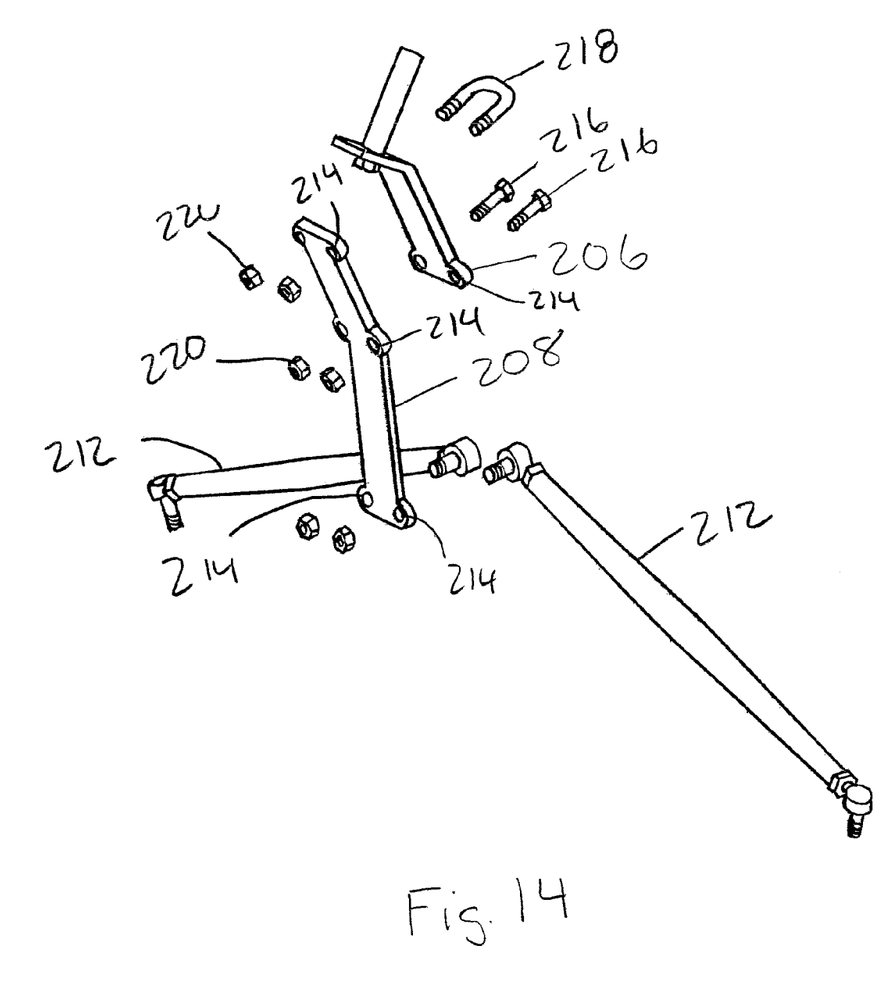
FIG. 14 is a perspective view of a steering components of a front suspension lift system according to the present invention.

FIGS. 13-14 show a different steering configuration which can be employed. An existing steering bracket 206 of the golf cart 20 is attached to a steering extension bracket 208 to account for a different position of the axle assembly 210 in relation to the tie rods 212. The steering extension bracket 208 is attached to the existing steering bracket 206 using bolt holes 214, bolts 216, a U-shaped bolt 218 and nuts 220. The steering extension bracket 208 is shaped and angled to account for the required angles between the existing steering bracket 206 and the tie rods 212 which must connect to the steering arms 218 of the spindles 220.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

I claim:

1. A front suspension lift system for golf carts that is adjustable, comprising:
a main frame having two sides, front and rear, said main frame adapted to be attached to the golf cart;
an upper arm on each of said sides of said main frame, said upper arm pivotally connected to said main frame;
a lower arm on each of said sides of said main frame, said lower arm pivotally connected to said main frame, said lower arm below and parallel to said upper arm;
an axle assembly adapted to receive a wheel on each of said sides of said main frame, said axle assembly rotatably connected between said upper arm and said lower arm; and
at least one support which is adapted to mount to the golf cart, said at least one support having a plurality of holes to allow mounting of shocks between said lower arm and said at least one support, said plurality of holes allowing for adjustment of suspension parameters of said front suspension lift system based on which of said plurality of holes is chosen to mount said shock;
wherein said main frame includes a front plate and a bottom rear plate and wherein said main frame includes at least one bottom support connecting a bottom of said front plate to a bottom of said bottom rear plate.

2. The front suspension lift system of claim 1, wherein said main frame includes at least one center support connecting said front plate to said bottom rear plate.

3. The front suspension lift system of claim 1, wherein said main frame includes at least one top support connecting a top of said front plate to a top of said bottom rear plate.

4. The front suspension lift system of claim 3, wherein said main frame includes at least one center support connecting said front plate to said bottom rear plate.

5. The front suspension lift system of claim 1, wherein said upper arms and said lower arms are each A-arm shaped and have two main frame connection ends and one axle connection end; wherein said main frame connection ends of each of said upper arms and lower arms rotatably attach to said front plate and said bottom rear plate; wherein each of said axle connection ends are rotatably attached to said axle assembly.

6. The front suspension lift system of claim 1, further including at least one top support connecting said front plate and said bottom rear plate that continues from said bottom rear plate of said main frame and is adapted to attach to the golf cart.

7. The front suspension lift system of claim 6, wherein said at least one bottom support continues from said connection at said bottom rear plate of said main frame, and meets and attaches to said at least one top support which are all adapted to attach to the golf cart.

8. The front suspension lift system of claim 1, wherein said shock support is attached to said bottom rear plate and adapted to attach to the golf cart, thereby being a structural support between said main frame and the golf cart.

9. The front suspension lift system of claim 1, wherein there are two shock supports, said two shock supports each having a plurality of holes for mounting of a top of said shock allowing for adjusting the distance from a body of the golf cart to said axle based on which hole of said plurality of holes is used to mount said top of said shock, wherein said two shock supports are adapted to be mounted to existing framework of the golf cart.

10. A front suspension lift system for golf carts that is adjustable, comprising:
a main frame having two sides, front and rear, said main frame adapted to be attached to the golf cart;
an upper arm on each of said sides of said main frame, said upper arm pivotally connected to said main frame;
a lower arm on each of said sides of said main frame, said lower arm pivotally connected to said main frame, said lower arm below and parallel to said upper arm;
an axle assembly adapted to receive a wheel on each of said sides of said main frame, said axle assembly rotatably connected between said upper arm and said lower arm; and at least one support which is adapted to mount to the golf cart, said at least one support having a plurality of holes to allow mounting of shocks between said lower arm and said at least one support, said plurality of holes allowing for adjustment of suspension parameters of said front suspension lift system based on which of said plurality of holes is chosen to mount said shock;

wherein said main frame includes a front plate and a bottom rear plate and wherein said main frame includes at least one center support connecting said front plate to said bottom rear plate.

11. A front suspension lift system for golf carts that is adjustable, comprising:

a main frame having two sides front and rear, said main frame adapted to be attached to the golf cart;

an upper arm on each of said sides of said main frame, said upper arm pivotally connected to said main frame;

a lower arm on each of said sides of said main frame, said lower arm pivotally connected to said main frame, said lower arm below and parallel to said upper arm;

an axle assembly adapted to receive a wheel on each of said sides of said main frame, said axle assembly rotatable connected between said upper arm and said lower arm; and at least one support which is adapted to mount to the golf cart, said at least one support having a plurality of holes to allow mounting of shocks between said lower arm and said at least one support, said plurality of holes allowing for adjustment of suspension parameters of said front suspension lift system based on which of said plurality of holes is chosen to mount said shock;

wherein said main frame includes a front plate and a bottom rear plate, wherein said main frame includes at least one top support connecting a top of said front plate to a top of said bottom rear plate.

12. A front suspension lift system for golf carts that is adjustable, comprising:

a main frame having two sides, front and rear, said main frame adapted to be attached to the golf cart;

an upper arm on each of said sides of said main frame, said upper arm pivotally connected to said main frame;

a lower arm on each of said sides of said main frame, said lower arm pivotally connected to said main frame, said lower arm below and parallel to said upper arm;

an axle assembly adapted to receive a wheel on each of said sides of said main frame, said axle assembly rotatably connected between said upper arm and said lower arm; and at least one support which is adapted to mount to the golf cart, said at least one support having a plurality of holes to allow mounting of shocks between said lower arm and said at least one support, said plurality of holes allowing for adjustment of suspension parameters of said front suspension lift system based on which of said plurality of holes is chosen to mount said shock;

wherein said shock support is attached to said bottom rear plate and adapted to attach to the golf cart, thereby being a structural support between said main frame and the golf cart.

13. The front suspension lift system of claim 12, wherein said shock support is attached to said bottom rear plate and adapted to attach to the golf cart, thereby being a structural support between said main frame and the golf cart.

14. The front suspension lift system of claim 12, wherein there are two shock supports, said two shock supports each having a plurality of holes for mounting of a top of said shock allowing for adjusting the distance from a body of the golf cart to said axle based on which hole of said plurality of holes is used to mount said top of said shock, wherein said two shock supports are adapted to be mounted to existing framework of the golf cart.

\* \* \* \* \*